G. W. SMITH.
Hand Plow.

No. 64,917.

Patented May 21, 1867.

Witnesses:
Geo. W. Rothwell.
James L. Ewin.

Inventor:
George W. Smith
per Munn & Co
attys.

United States Patent Office.

GEORGE W. SMITH, OF MOUNT OLIVET, KENTUCKY.

Letters Patent No. 64,917, dated May 21, 1867.

IMPROVEMENT IN GARDEN CULTIVATOR.

*The Schedule referred to in these Letters Patent and making part of the same.*

TO ALL WHOM IT MAY CONCERN:

Be it known that I, GEORGE W. SMITH, of Mount Olivet, in the county of Bracken, and State of Kentucky, have invented a new and improved Garden Cultivator; and I do hereby declare that the following to be a full, clear, and exact description of the same, sufficient to enable one skilled in the art to which the invention appertains to make use of it, reference being had to the accompanying drawings, forming a part of this specification, and in which—

Figure 1:
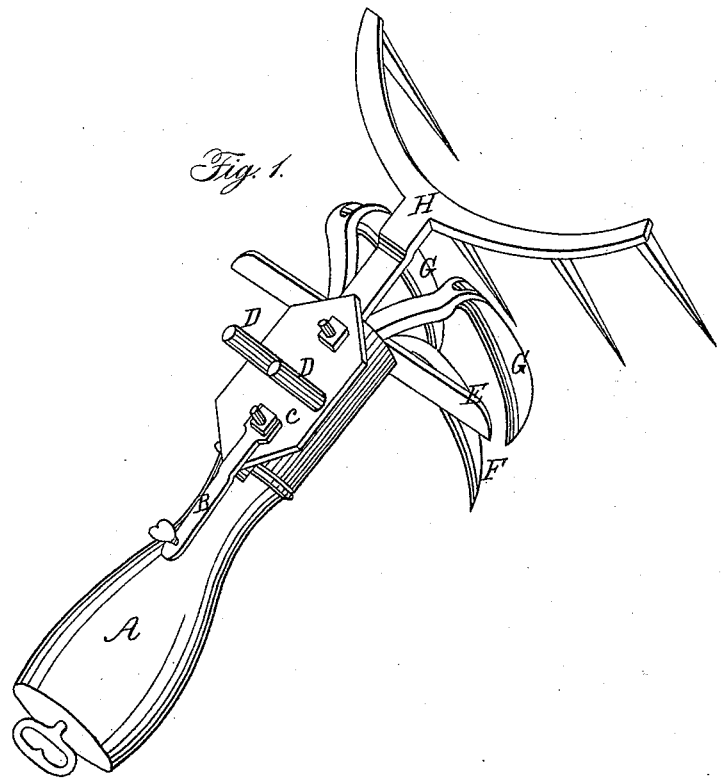
Figure 1 is a perspective view.
Figure 2:
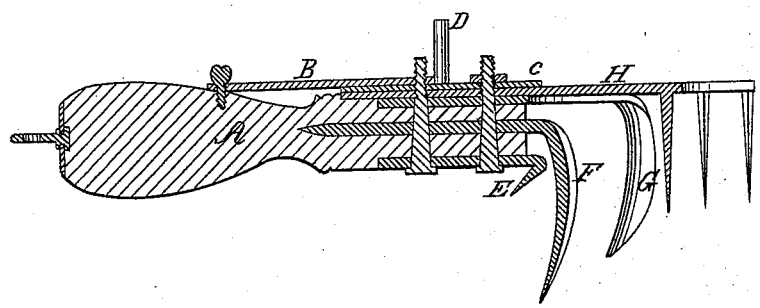
Figure 2 is a longitudinal section.

This is a garden tool combining a weed-cutter or hoe, a single shovel-share, a pair of shares acting as a double shovel, and, lastly, a rake or harrow. Arrangements are further made for weighting the tool to give it sufficient penetration, and for the attachment of a draught-strap if desired.

In the drawings, A is the handle, which may be of any length desired, according to the purpose the swivel B is intended for the attachment of a strap when it is desired to draw upon it as a plough. C is a plate attached to the upper side, and having uprights D D, which are intended to hold weights of cast iron, whose purpose is to sink the blades, shares, or teeth deeper into the ground.

The tools penetrating the ground are of three characters, a cutting edge, shares, and rake-teeth. These may be used singly or all in combination. In the latter case the blade acts to cut the weeds, while the succeeding ploughs stir the ground, the rake levelling it and collecting the trash. It will frequently, however, be desirable to use the portions separately for which they are arranged, to be readily attached and detached, as their shanks slip into the holder and are secured there by bolts. The knife-edge or hoe E is used for cutting weeds; the single ploughshare or shovel F for working between rows of young plants; the double plough G G for working the soil on each side of a row of young plants; the harrow H for levelling the soil and collecting refuse.

Having described my invention, what I claim as new, and desire to secure by Letters Patent, is—

The cultivator in its combined form, having a number of tools, E, F F, G G, H, easily detached for separate use, and capable of combined use, substantially as described.

To the above specification of my invention I have signed my hand this sixth day of December, 1866.

GEO. W. SMITH.

Witnesses:
N. C. BALL,
PETER L. LINVILLE.